United States Patent [19]

Dillmann et al.

[11] 4,331,460
[45] May 25, 1982

[54] MIST COLLECTOR FOR SEPARATING DROPS OF LIQUID FROM STREAMS OF GAS FOR VAPOR

[75] Inventors: Hans G. Dillmann, Eggenstein; Jürgen Furrer, Karlsruhe; Horst Pasler, Linkenheim-Hochstetten, all of Fed. Rep. of Germany

[73] Assignee: Kernforschungszentrum Karlsruhe GmbH, Karlsruhe, Fed. Rep. of Germany

[21] Appl. No.: 174,584

[22] Filed: Aug. 1, 1980

[30] Foreign Application Priority Data

Aug. 4, 1979 [DE] Fed. Rep. of Germany ....... 2931702

[51] Int. Cl.$^3$ ............................................. B01D 50/00
[52] U.S. Cl. ........................................ 55/485; 55/501; 55/510; 55/525; 55/DIG. 9; 55/DIG. 25
[58] Field of Search ................... 55/485, 487, 498–501, 55/510, 525, 526, DIG. 9, DIG. 25; 210/338, 345, 451, 454, 489, 492

[56] References Cited

U.S. PATENT DOCUMENTS 2,050,581  8/1936  Orem ..................................... 55/485
2,442,818  6/1948  Lyman ................................... 210/338
2,619,188  11/1952 Haw et al. ............................. 55/525
2,745,513  5/1956  Massey ............................. 55/DIG. 25
3,349,919  10/1967 Royer et al. ......................... 210/338
3,772,857  11/1973 Jackson et al. ....................... 55/487
3,780,872  12/1973 Pall ..................................... 55/525
3,880,626  4/1975  Griwatz et al. ....................... 55/525
4,144,040  3/1979  Claes et al. ........................... 55/487

FOREIGN PATENT DOCUMENTS 483991  12/1975  U.S.S.R. .............................. 210/338

Primary Examiner—David L. Lacey
Attorney, Agent, or Firm—Spencer & Kaye

[57] ABSTRACT

In a mist collector for separating drops of liquid from a gas or vapor stream and including a cylindrical housing and metal fiber webs mounted in an annular configuration in the housing and arranged to be penetrated by the stream in the radial direction of the housing, the metal fiber webs are composed of a plurality of cylindrical layers spaced apart from one another in the radial direction and the collector is provided with stream conducting elements positioned and arranged with respect to the housing for causing the stream to flow through the layers in a radial inward direction.

3 Claims, 1 Drawing Figure

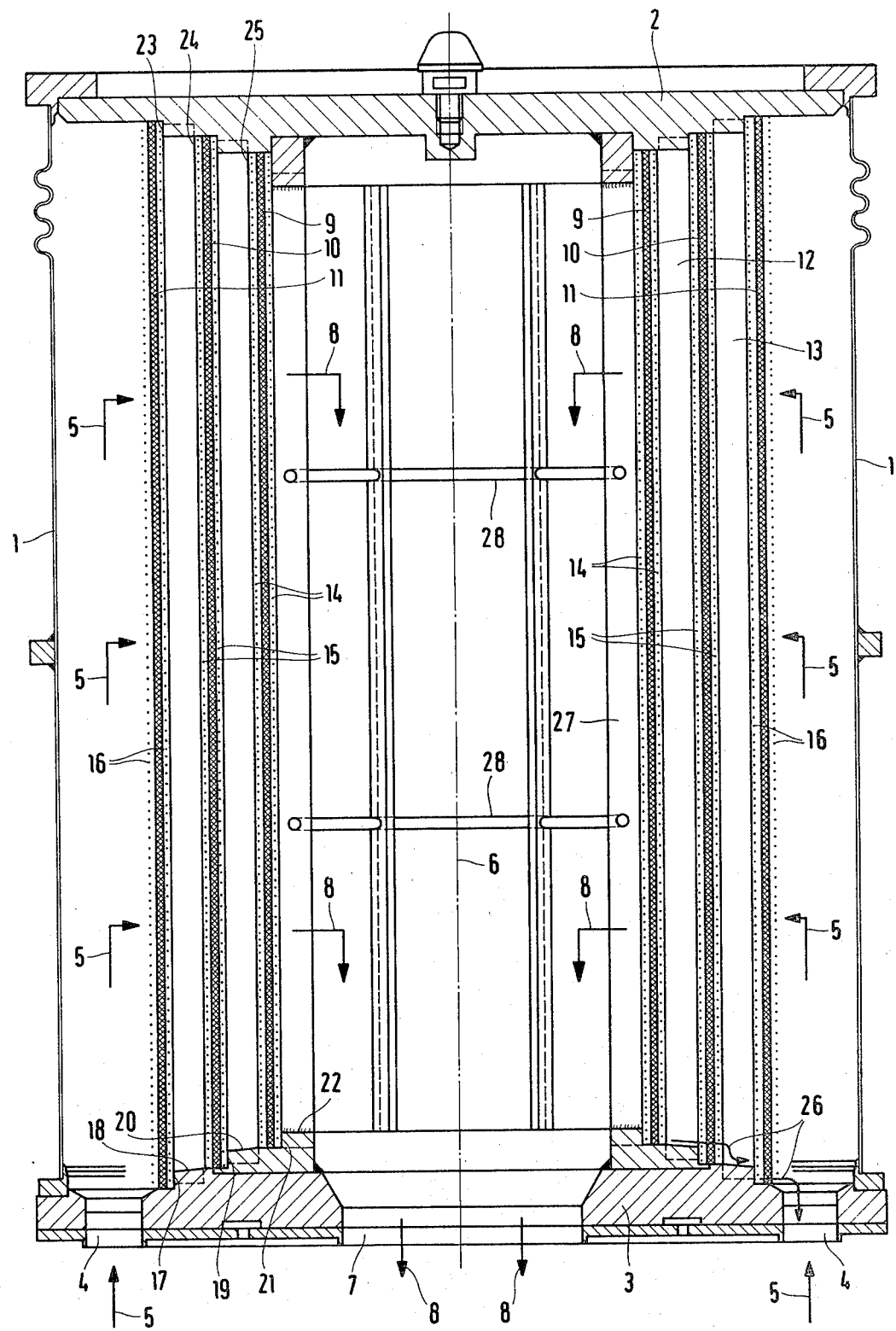

MIST COLLECTOR FOR SEPARATING DROPS OF LIQUID FROM STREAMS OF GAS FOR VAPOR

BACKGROUND OF THE INVENTION

The present invention relates to a mist collector for separating drops of liquid from a gas or vapor stream, which collector is of the type composed of metal fiber webs arranged in an annular array in a housing so as to be radially penetrated by the stream to be purified.

A known mist collector made of a metal fiber web has an annular shape and is constructed to be supplied in a manner such that flow of the stream occurs from the inside to the outside. This collector is a single-stage separator which is made of a relatively thick material and therefore does not produce a particularly high separating effect. Moreover, the prior art mist collector exhibits a relatively high pressure drop and, due to the material of which it is made, it is neither flame nor heat resistant.

SUMMARY OF THE INVENTION

It is an object of the present invention to improve the pressure drop, separating output and drainage effect parameters of a mist collector of the above-described type.

This and other objects are achieved, according to the present invention by a novel mist collector which includes a plurality of cylindrical layers of mats spaced one behind the other, each layer of mats being held between two supporting grids and in which the stream to be treated flows radially inwardly.

According to preferred embodiments of the invention, the individual layers of mats are formed of fibers whose thickness decreases from one mat to the next from the outside toward the inside, or in the flow-through direction. In further accordance with the invention, the individual annular and concentrically arranged layers of mats are placed on a bottom provided with annular recesses or steps, respectively, which are adapted to the respective mat layer, the recesses or steps descending from the inside toward the outside, i.e. forming a stepped cascade on the bottom from the inside toward the outside, or counter to the direction of stream flow. Finally, according to particularly advantageous embodiments of the invention, the inlet openings for the gas stream are disposed in the annular chamber at the outer edge of the bottom of the first step between the outermost metal fiber mat and the housing wall surrounding the mats, and the outlet opening is disposed in the center of the bottom inside of the innermost ring of mats on the uppermost step of the bottom.

A particular advantage of the present invention is that large quantities of droplets are separated at the outer region of the collector but only small quantities at the inner region. This reduces the danger of droplets reaching the purified gas or vapor side. The low pressure drop occurring in a mist collector according to the invention is a particularly favorable feature, as is the substantial improvement in drainage.

The liquid separated out of the stream flows counter to the direction of flow back to the stream inlet side. This is of particular advantage when the mist collector is used in nuclear plants in which radioactive substances may be present in the untreated air, since no radioactivity will then reach the purified, i.e. stream outlet, side. Further advantages of collectors according to the invention are their high heat resistance, their action as a mud barrier, and their radiation resistance. Moreover, a long service life can be realized by internal or external rinsing with specific solvents due to the short time required for such rinsing.

BRIEF DESCRIPTION OF THE DRAWING

The sole FIGURE is a cross-sectional view through a diametral plane of a preferred embodiment of the invention.

DESCRIPTION OF THE PREFERRED EMBODIMENTS

The FIGURE is a sectional view showing the cylindrical sheet metal body 1 of a mist collector which is closed by means of a top cover 2 and a bottom cover 3. The outer edge of the lower cover 3 is provided with a ring of inlet openings 4 for the gas to be processed, or raw gas, 5 and its center 6 is provided with an outlet opening 7 for the purified gas.

The main elements of the mist collector are three annularly arranged metal fiber webs or mats 9, 10 and 11 which lie one inside the other in layers. The three layers 9, 10 and 11 are separated from one another by annular spaces 12 and 13. Each layer is held separately at both major faces by means of a wire mesh or supporting grid 14, 15 or 16. The mats 9, 10 and 11 in the grids 14, 15 and 16 can be penetrated by the stream since they are made of metal fiber webs composed of thin wires.

According to preferred embodiments of the invention, the wire thickness decreases from the outer layer 11 toward the inner layer 9, i.e., the number of fibers in a layer and hence the density of the mats increases in the direction of flow from the outside toward the inside. In that way the droplets of the gas stream 5 are separated at the mats in stages in that a large quantity of liquid is present in the outer region but only a small quantity of liquid is present in the inner region. The separated liquid then flows downwardly along the layers of mats 9, 10 and 11 and collects at the bottom 3 of the mist collector.

This bottom 3 is provided, according to the invention, with steps which descend from the inside toward the outside in a particular manner so that the liquid will always flow outwardly in the direction toward the inlet opening 4 for raw gas 5 and never in the direction of the outlet opening 7 for purified gas 8.

Proceeding radially from the outside toward the inside, the above-mentioned bottom 3 has, adjacent inlet openings 4, an annular recess 17 at its inside on which the mat 11 in grid 16 has been placed and secured by means of screws and which leads to a first upward step 18. From this, a second recess 19 leads to a second upward step 20 and the mat 10 is seated in this second recess in the same manner as the above-mentioned first mat. From the second step 20 a third recess 21 leads to a third and innermost upward step 22 of the cover 3. To the inside of step 22 there is disposed, in the center, the outlet opening 7 for the purified gas 8. The mat 9 in its grid 14 is fastened to the third recess 21 in the same manner as that described above with reference to mat 11. Similar steps 23, 24 and 25 in the upper cover 2 hold the upper ends of the mats spaced apart in the desired manner.

The liquid separated from the gas stream 5 at the mats now flows, as already mentioned, along the layers of mats 9, 10 and 11 or its grids 14, 15 and 16, respectively, to the bottom 3 and across steps 22, 20 and 18 along a downward and outward path 26 and can flow off in the manner of drainage through openings 4 for the raw gas 5 or can be actively extracted along that path, respectively.

A supporting structure 27 including holding rings 28 serves to improve the mechanical stiffness of the separator or to hold the metal fiber mats 9, 10 and 11 or their supporting grids 14, 15 and 16, respectively.

It will be understood that the above description of the present invention is susceptible to various modifications, changes and adaptations, and the same are intended to be comprehended within the meaning and range of equivalents of the appended claims.

What is claimed is:

1. In a mist collector for separating drops of liquid from a gas or vapor stream and including a cylindrical vertically oriented housing having a cylindrical outer wall and metal fiber webs mounted in an annular configuration in the housing and arranged to be penetrated by the stream in the radial direction of the housing, the improvement wherein: said metal fiber webs comprise a plurality of cylindrical layers spaced apart from one another in the radial direction; said collector comprises stream inlet means and stream outlet means positioned and arranged with respect to said housing and positioned relative to said layers for causing the stream to flow through said layers in a radial inward direction; said housing comprises a base defining one axial end thereof and on which said housing rests when in operation, with the surface of said base which is directed inwardly of said housing comprising a plurality of annular steps descending in the radial outward direction of said housing and formed to guide all liquid thereon downwardly and radially outwardly, and with each said layer being supported on a respective step; the radially outermost one of said layers is separated from the cylindrical wall of said housing by an annular chamber; said stream inlet means comprises a stream inlet located in said base in alignment with said annular chamber and terminating at a level below the lowermost one of said steps; and said stream outlet means comprises a stream outlet located in said base and radially inward of the innermost one of said layers.

2. The collector as defined in claim 1 further comprising two supporting grids positioned and arranged with respect to each said layer and between which said associated layer is held.

3. The collector as defined in claim 1 or 2 wherein said layers are composed of fibers having diameters which decrease from one layer to the next in the radial inward direction.

* * * * *